Feb. 17, 1970   R. A. LOUKS ET AL   3,495,598
COMBINE BLOWER ATTACHMENT

Filed Nov. 21, 1966   7 Sheets-Sheet 1

INVENTORS
ROBERT A. LOUKS
VERNON H. SIETMANN
BY
ATTORNEY

Feb. 17, 1970 R. A. LOUKS ET AL 3,495,598
COMBINE BLOWER ATTACHMENT
Filed Nov. 21, 1966 7 Sheets-Sheet 2
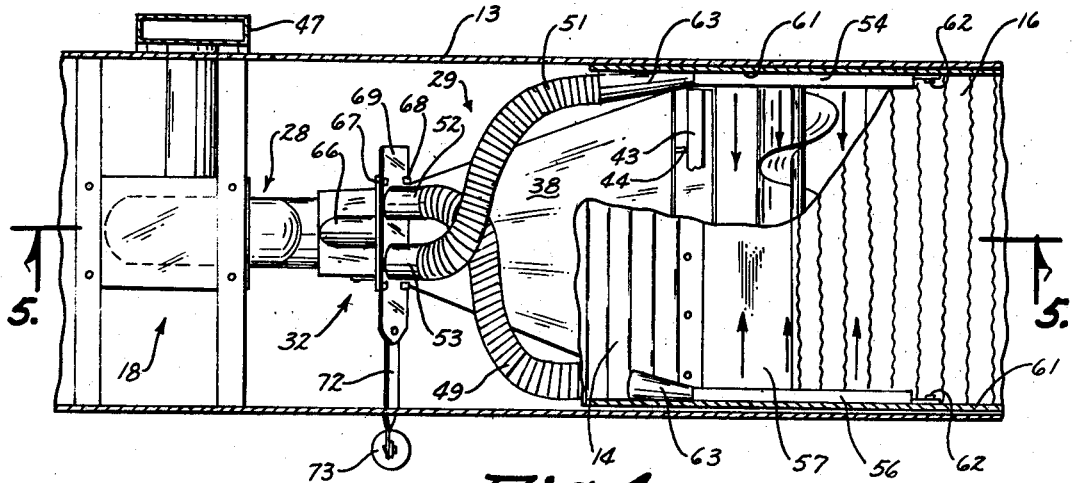
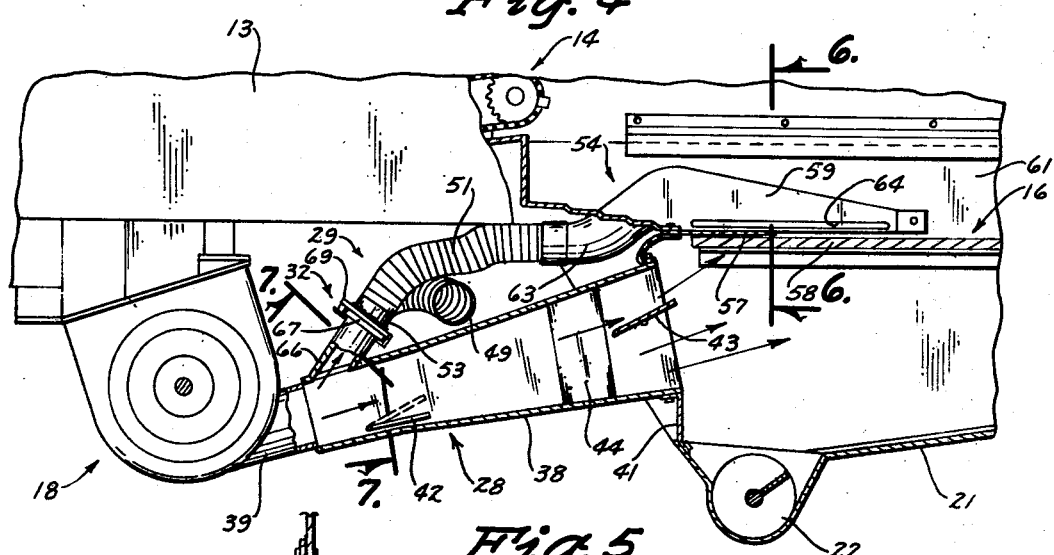
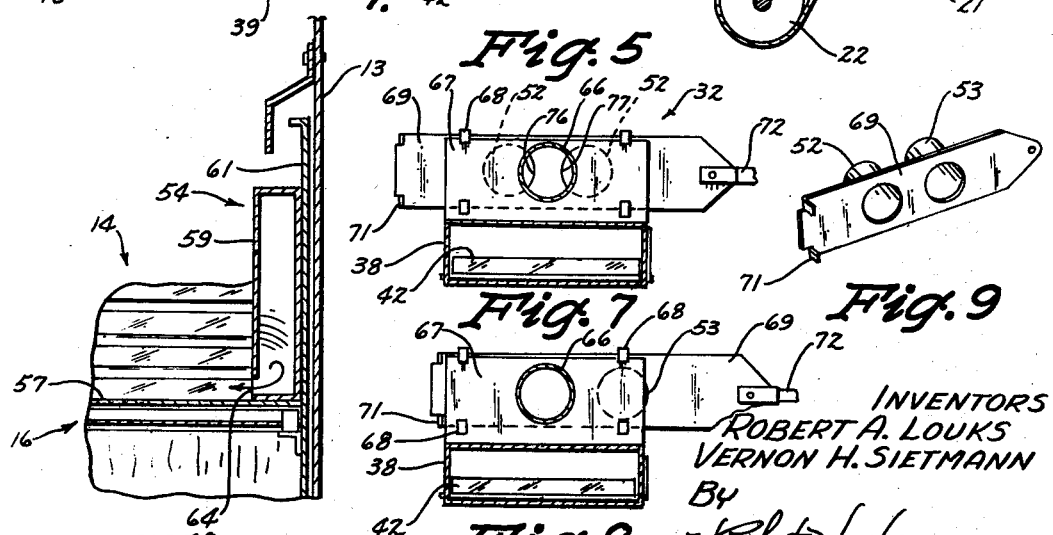
INVENTORS
ROBERT A. LOUKS
VERNON H. SIETMANN
BY
ATTORNEY

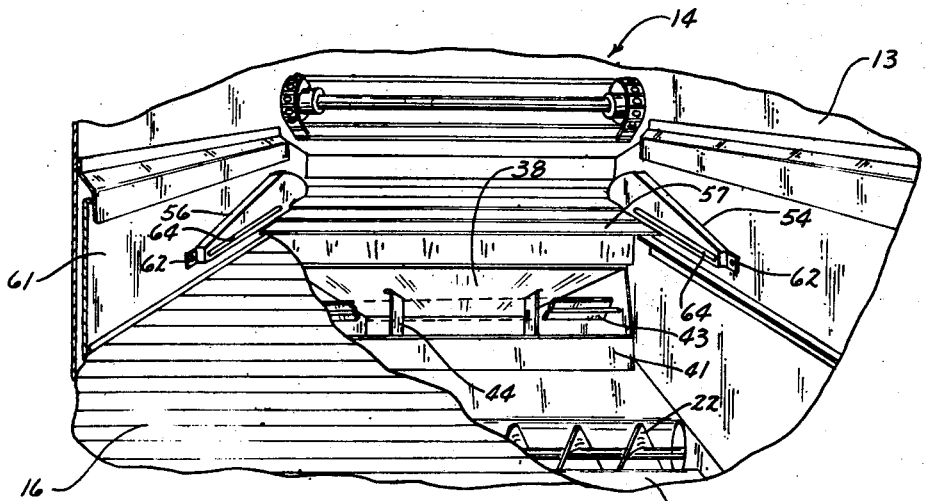
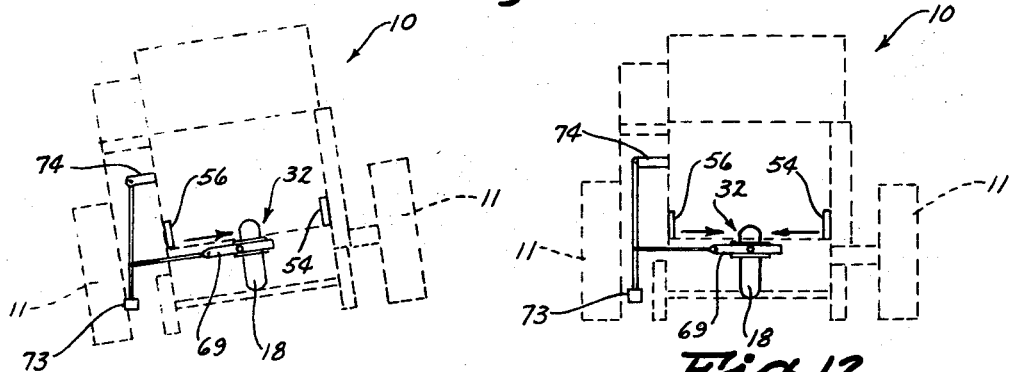
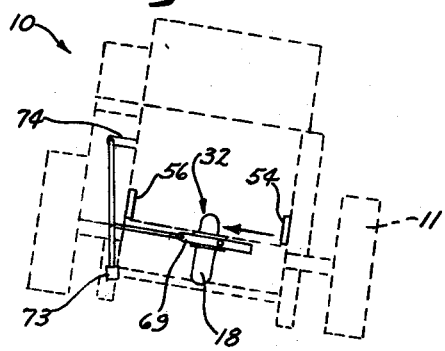
INVENTORS
ROBERT A. LOUKS
VERNON H. SIETMANN
BY
ATTORNEY

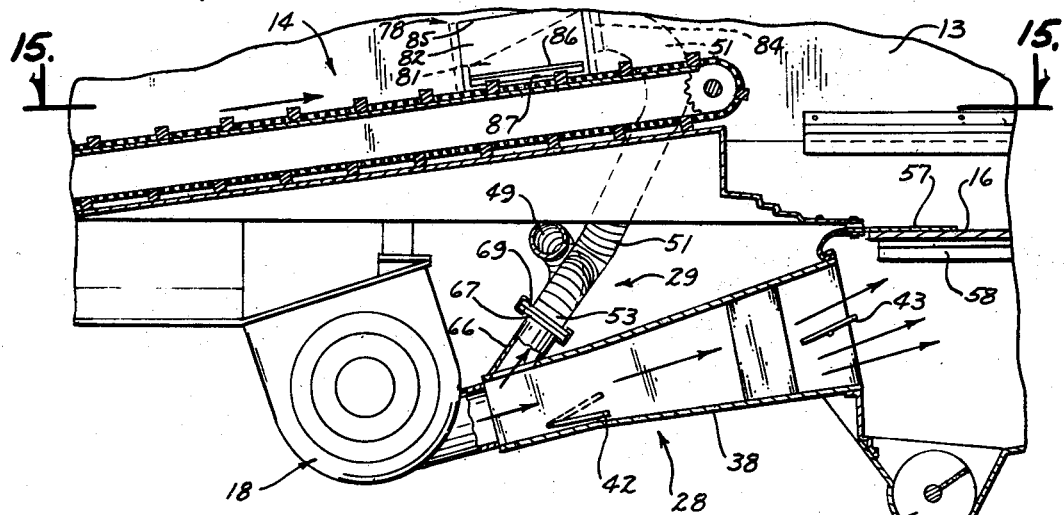
Fig. 14
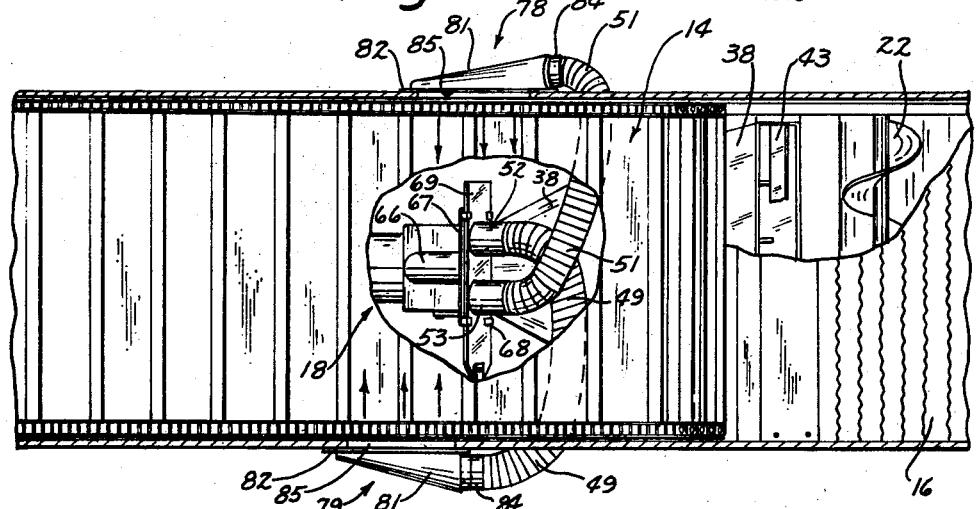
Fig. 15
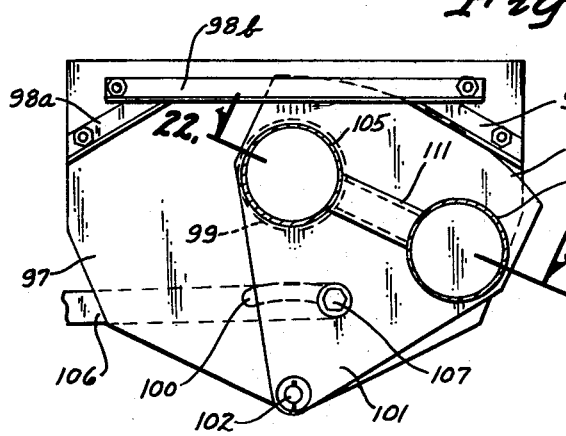
Fig. 21
Fig. 22
INVENTORS
ROBERT A. LOUKS
VERNON H. SIETMANN
ATTORNEY Feb. 17, 1970  R. A. LOUKS ET AL  3,495,598
COMBINE BLOWER ATTACHMENT
Filed Nov. 21, 1966  7 Sheets-Sheet 5

INVENTORS
ROBERT A. LOUKS
VERNON H. SIETMANN
BY
ATTORNEY

Feb. 17, 1970 R. A. LOUKS ET AL 3,495,598
COMBINE BLOWER ATTACHMENT
Filed Nov. 21, 1966 7 Sheets-Sheet 6

INVENTORS
ROBERT A. LOUKS
VERNON H. SIETMANN
BY
Robert Henderson
ATTORNEY

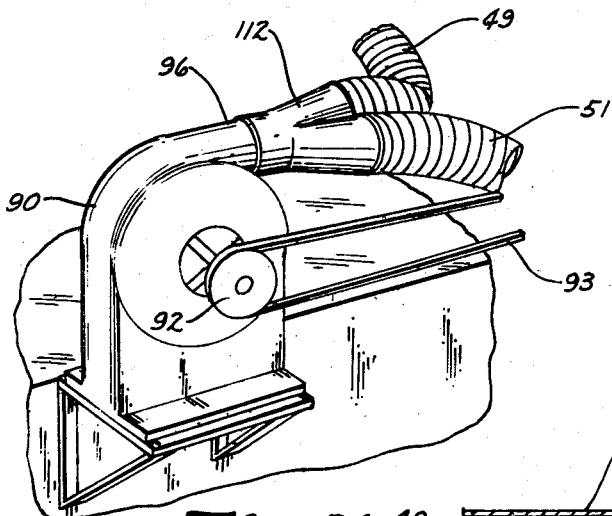
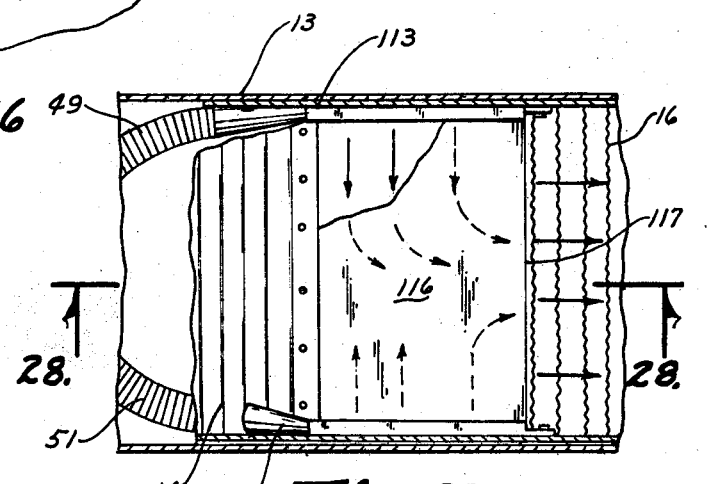
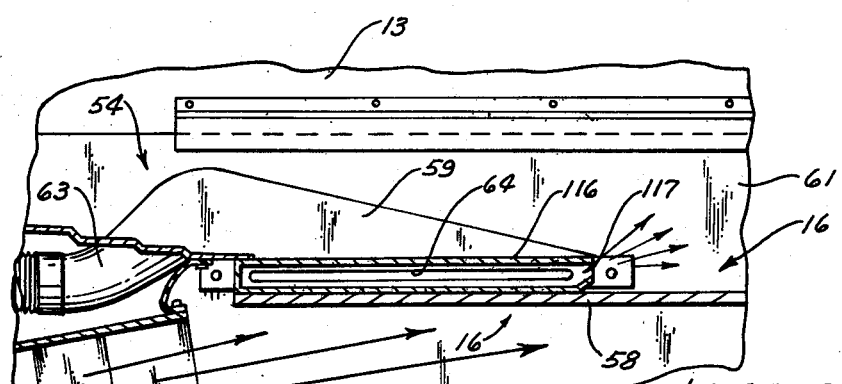

United States Patent Office 3,495,598
Patented Feb. 17, 1970

3,495,598
COMBINE BLOWER ATTACHMENT
Robert A. Louks, Gilman, and Vernon H. Sietmann, Laurel, Iowa; said Vernon H. Sietmann assignor of fourteen-fortieths to Gerald F. Dendel, Costa Mesa, Calif.
Filed Nov. 21, 1966, Ser. No. 595,852
Int. Cl. A01f *12/44;* B07b *9/00, 1/28*
U.S. Cl. 130—27     8 Claims

ABSTRACT OF THE DISCLOSURE

This invention relates to an accessory for a conventional combine which includes a separator area where the grain is separated from the chaff and other foreign material, and comprises in one embodiment a high speed blower mounted on the underside of the combine that delivers air under static pressure through a pendulum operated valve and conduits to a pair of manifolds on opposite sides of the separator for directing opposed streams of air across the operating surface of the separator area in relation to the inclination o fthe combine; arator area in relation to the inclination of the combine; and comprises in another embodiment a valve placed in combination with a separate high speed blower for directing at least an amount of air under static pressure and less than the normal amount through both manifolds when the combine is on level terrain, and through the high side manifold when the combine is inclined, with of course the majority of air being directed through the low side manifold in the latter situation.

---

This invention relates generally to a grain harvester, and more particularly to an apparatus for aiding the separation of grain from the straw and chaff.

In recent years, the combine harvester, or harvester-thresher, has become the universally accepted machine for harvesting grain crops. A conventional machine of this character comprises a body unit containing threshing and separating apparatus, which carries in front of it a header unit containing grain cutting and conveying apparatus. As the machine is moved through the fields, grain cut by the cutting apparatus is conveyed to the body unit where it is threshed, and where the grain kernels are separated from the straw and chaff.

Conventional grain harvesters include as a part of the separating mechanism horizontally disposed screens or sieves upon which the kernels, chaff, and unthreshed heads are deposited after the straw is separated from them. The screens or sieves are reciprocated rapidly in a fore and aft direction in the path of a rearwardly and upwardly directed stream of air from a fan mounted in the body unit to separate the kernels from the chaff and unthreshed heads. The small, relatively heavy kernels pass through the screens and are collected therebeneath. The light chaff is blown out of the rear end of the body unit. The unthreshed heads, being too large to pass through the screens but too heavy to be blown with the chaff, drop from the rear edges of the screens and are collected for rethreshing.

Further included in conventional grain harvesters is a blower fan mounted beneath the separation and cleaning housing which pulls air in from each end thereof and forces it, through a port or duct, upwardly and through the sieve or screen area. In certain areas of terrain, it has been found that the air pulled in by the blower fan and forced through the screens is so dirty and full of foreign material itself, the efficiency of the forced air is considerably lowered.

It can readily be seen that for the separation process to be efficient so as to separate all the kernels from the straw and chaff, the grain must be maintained in a level condition on top of at least the uppermost screen. In operation of this type machine over fairly level terrain, the problem is not too serious. One present day method of solving the present problem is by the use of laterally spaced dividers or separators extended longitudinally on top of the screens.

In hilly areas, however, the problem is more serious, losses of from 5–10 bushels of grain an acre being reported, due to the uneven distribution of the grain on the screens. Many solutions of this problem have been suggested, with several being presently used. The great majority of these deal with mechanisms for maintaining the screens themselves level during movement of the combine over the hilly terrain.

It is a purpose of this invention to maintain the grain being separated and cleaned by the raddle and riddle units, respectively, in a level condition over these units, rather than maintaining, for example, the riddle unit level, as the combine harvester moves over sloping terrain such that it tilts to one side or the other. This can readily be accomplished by a blanket of air blown from both sides of a screen substantially, at least initially, normal to the flow of the grain. The opposed air blankets are pushed closely over and in directions parallel to the surface of the screen, and tangential to the normal flow of the grain, with the pressure along the entire length of the air stream being the same. Putting it another way, the air blankets move parallel to and then tangentially of the longitudinally axis of the transporting axle of the machine.

It has been found that the use of the opposed streams beginning at the forward end of the upper screen and extended rearwardly approximately one-third the length thereof, with the air being emitted from a pair of manifolds at a static pressure of from eight to ten inches, is preferable. The static pressure maintains the air blankets moving as a body angularly to the longitudinal flow of the grain and foreign material associated therewith over the surface of the riddle. Importantly, the blankets of air attack the grain and other material as they move over the riddle only.

In our copending application, Ser. No. 514,859 filed Dec. 20, 1965, a partial solution to this problem was disclosed. In that disclosure, the air blanket forming manifolds were placed on opposite sides of the housing in a stationary mannery, and with air under pressure derived from a blower fan auxiliary to the underside blower fan.

Continuing tests and development of that structure showed several areas of improvement. It was ascertained that certain riddles or screens are reciprocated not only fore and aft, but also slightly upwardly and downwardly. Thus, the fixed manifold housing did not always force a blanket of air directly over the surface of the oscillating screens. Furthermore, material tended to lodge beneath the manifold housings and distort same as the screens oscillated therebeneath.

It was also found that the source of air pressure for the manifolds could be derived from the underside blower fan without impairing the capacity output thereof for cleaning purposes, and that the efficiency of this arrangement was greatly increased by obtaining clean air from near the top of the combine harvester rather than at the far location.

Additionally, the manifolds were located on opposite sides of the raddle or separator unit rather than on opposite sides of the riddles, and it was ascertained that the efficiency and effectiveness of the system in this area was still considerably greater than that known or obtained in other known forced air systems.

It is, therefore, an object of this invention to provide an improved combine, particularly in the increased efficiency of the grain separating structure.

It is another object of this invention to provide an apparatus operable to maintain the grain on the upper surface of a separator chaffer or riddle in a level condition during reciprocation of the riddle, irrespective of the lateral inclination of the combine.

Another object of this invention is to provide such an apparatus which can be installed initially as an integral part of a new combine, or which can readily be installed after manufacture of the combine, as an accessory item.

Yet another object of this invention is to provide such an apparatus for emitting an opposed pair of blankets of air under pressure in directions initially normal to the flow of the grain over a riddle, which blankets move directly over and parallel to the surface of the riddle.

Still another object of this invention is to provide such an apparatus with an air supply system utilizing a pair of manifolds mounted on opposite sides of a riddle such that blankets of air emitted therefrom over the surface of the riddle are under static pressure, thereby enabling more accurate direction and control of the air with reference to a fluctuating demand placed thereon.

It is another object of this invention to provide such an apparatus wherein the place and amount of air being directed over a riddle is completely determined by the inclination of the combine relative to a level terrain.

Yet another object of this invention is to provide such an apparatus wherein opposed blankets of air are forced directly over and parallel to the surface of a riddle even when said surface is substantially horizontal.

Another object of this invcention is to provide an apparatus as characterized hereinbefore wherein the said blankets of air are also directed over the surface of a raddle or separator unit.

Another object of this invention is to provide an apparatus as characterized hereinbefore wherein the blankets of air are directed over the surface of a riddle or raddle irrespective of the position of the respective riddle or raddle.

Yet another object of this invention is to provide an apparatus as characterized hereinbefore wherein air is forced through manifold housings on opposite sides of a separator or cleaning area, which air is derived from the underside blower fan used to force air upwardly and through the cleaning area, and with the air obtained from near the top of the harvester rather than from at the blower fan.

Still another object of this invention is to provide an apparatus of the type characterized hereinbefore, and further wherein an overhead, auxiliary blower fan is provided for forcing air through manifold means on either side of a saddle unit, controlled by a valve device responsive to the tilt of the machine, whereby to maintain the grain level across the raddle unit irrespective of the transverse tilt of the machine.

Another object of this invention is to provide such an apparatus which is simple, rugged, economical to manufacture, easily maintained, and effective in operation.

It is another object of this invention to provide a commercially available grain harvester with a static air pressure type blower as a substitute for the conventional blower fan, enabling thereby more pressure and cleaner air for the riddles.

Still another object of this invention is the provision of an auxiliary blower mounted on top of the harvester for sending air under static pressure to manifolds on both sides of either a raddle unit or a separator unit, and wherein a minimum amount of air is always directed to both manifolds to provide a positive flow of air outwardly of each manifold at all times when the blower system is operating.

Yet another object of this invention is the provision of a pair of opposed manifolds as outlined hereinbefore from which equal amounts of air under pressure are being discharged at all times during operation, and irrespective of the position of the harvester.

Another object of this invention is the provision of a manifold system placed over the riddle unit adjacent its innermost end for effecting a suspension of foreign material in the air, apart from the grain, thereby obtaining, with no concentration of trash and grain, an increased capacity of cleaner grain.

These objects, and other features and advantages of this invention will become readily apparent upon reference to the following description when taken in conjunction with the accompanying drawings, wherein:

FIG. 4 is an enlarged, fragmentary plan view of the structure of FIG. 3 with certain parts removed and broken away for clarity of invention;

FIG. 5 is a sectional view taken along the line 5—5 in FIG. 4; with certain parts broken away and others shown in elevation for clarity of illustration;

FIG. 6 is an enlarged sectional view taken along the line 6—6 in FIG. 5;

FIG. 7 is a sectional view taken along the line 7—7 in FIG. 5 and showing a valve arrangement in one position thereof;

FIG. 8 is a view similar to FIG. 7 and showing the valve arrangement in a different position;

FIG. 9 is a perspective view of a detail of the valve arrangement of FIGS. 7 and 8;

FIG. 10 is a perspective view of the interior of the sieve or riddle area of the harvester as taken from the rear end thereof, with certain parts broken away;

FIGS. 11, 12 and 13 are reduced schematic views as seen from the rear of the harvester showing by the use of arrows the flow of air across an upper riddle, the harvester as shown in phantom shown in a horizontal plane, and inclined to either side thereof;

FIG. 14 is a view similar to FIG. 5 of a modified arrangement wherein air from a lower blower is directed to opposite sides of a raddle or separator unit;

FIG. 15 is a plan view of the structure of FIG. 14, with certain parts broken away for clarity of illustration;

FIG. 21 is a view similar to FIG. 19, and showing the valve plates thereof in a changed position;

FIG. 22 is a sectional view taken along the line 22—22 in FIG. 21;

FIG. 26 is a perspective view similar to FIG. 18 of a third embodiment of the blower arrangement;

FIG. 27 is a top plan view of the interior of the harvester for the third embodiment at the innermost end of an upper riddle, and showing an air chamber compartment inserted between the post manifold housings; and FIG. 28 is an enlarged sectional view taken along the line 28—28 in FIG. 27.

Figure 1:
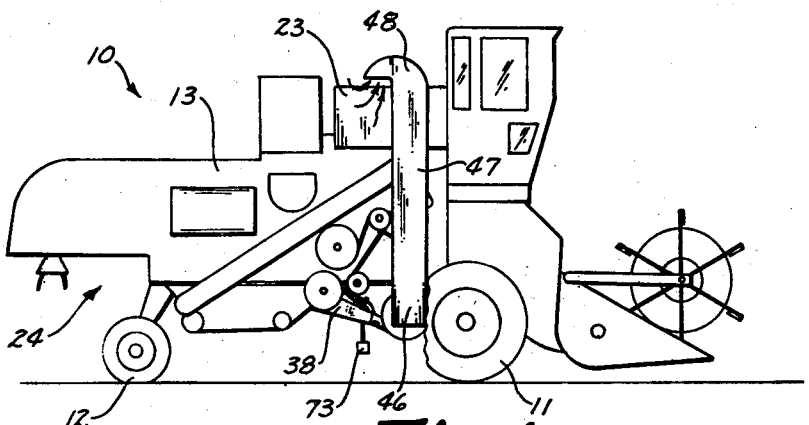
FIG. 1 is a side elevational view of a combine harvester with which the apparatus of this invention is embodied.
Figure 2:
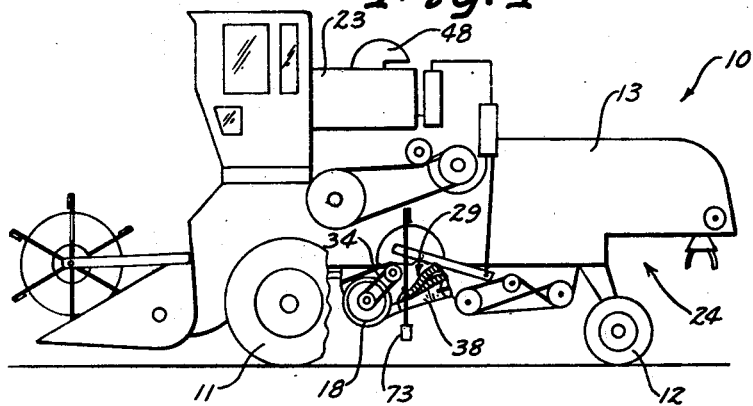
FIG. 2 is an elevational view of the other side of the combine harvester of FIG. 1.

Referring to the drawings, the apparatus of this invention, of which there are several modifications, is shown attached to a conventional combine indicated generally at 10 in FIG. 1. The combine 10 is mounted on a pair of drive wheels 11 and a pair of rear dolly wheels 13.

The threshing and separating elements of the combine 10 are mounted inside a housing 13, the bottom rear area of which is open. As is well known in the art, after the threshing operation, about ninety percent of the grain is passed over a raddle or separator unit 14 (see FIG. 14) and thence downwardly to a cleaning mechanism. Grain still remaining in the straw is dislodged by commonly called "straw walkers" 15 (FIG. 23) which are mounted above the cleaning mechanism. Operation of the straw walkers effects a final separation of the grain, whereupon the grain falls downwardly either directly onto the cleaning mechanism, or onto a return conveyor for movement to the rear of the mechanism as described more in detail hereinafter.

Figure 23:
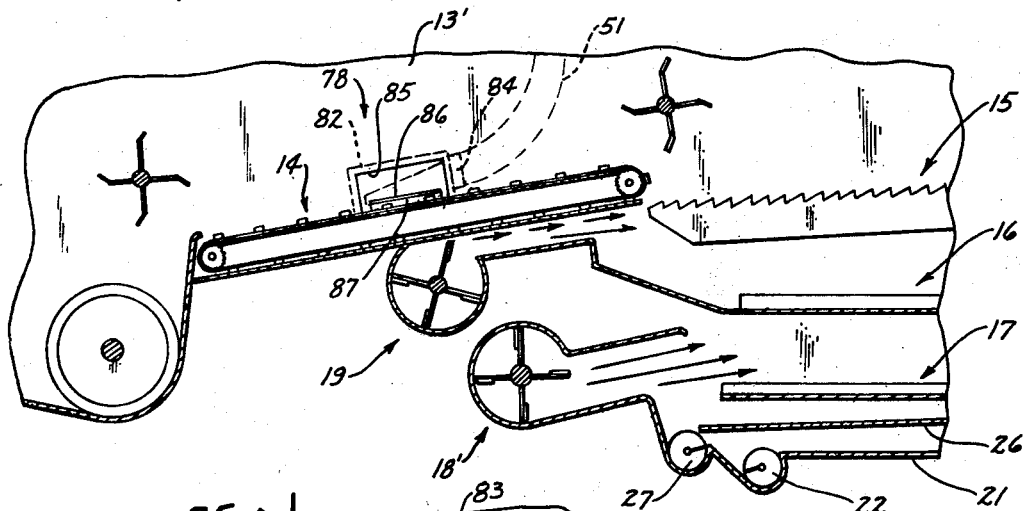
FIG. 23 is a view similar to FIG. 5, and showing the blower fans as provided for the FIG. 16 embodiment.

The cleaning mechanism itself comprises at least one sieve or riddle 16 (FIG. 5), and in some instances with the riddle 16 being an upper sieve, and a lower sieve or riddle 17 as shown in FIG. 23. The riddles 16 and 17 are reciprocated backwards and forwards longitudinally of the housing 13 to agitate, in conjunction with air from a lower cleaning fan 18 (FIG. 5), the material deposited thereon. In some instances an upper fan 19 (FIG. 23) is provided for precleaning the grain as it is coming off the separator unit 14 (FIG. 5) onto the innermost end of the riddle 16.

Grain kernels deposited on the riddles are permitted to work therethrough and drop onto a collecting pan 21 (FIG. 5) therebeneath which forms part of the bottom of the housing 13. The pan 21 contains a grain auger 22 (FIG. 5) which transports the grain transversely to an elevator (not shown) where it is elevated to a grain tank 23 (FIG. 1) on the machine.

Chaff and other foreign material deposited on the riddles 16 and 17 is caught in an air stream and blown out a discharge opening 24 (FIG. 1) formed at the rear of the housing 13. Unthreshed heads which do not work through the riddles are moved to the rear thereof and permitted to drop off onto a second collecting pan 26 (FIG. 23) for deposit into a tailings auger 27 for return to the threshing cylinder (not shown) for recirculation through the machine 10.

Figure 3:
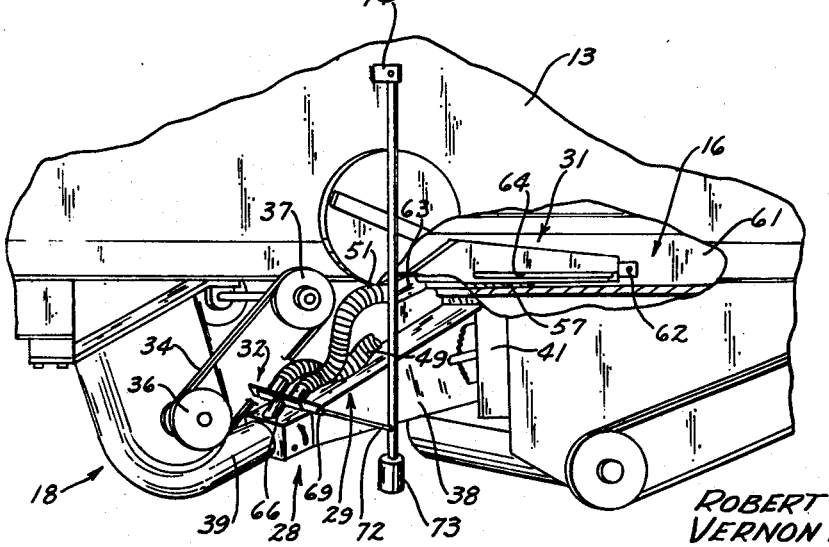
FIG. 3 is an enlarged, fragmentary perspective view of the underside blower fan arrangement of this invention, certain parts broken away for clarity of invention.
Figure 16:
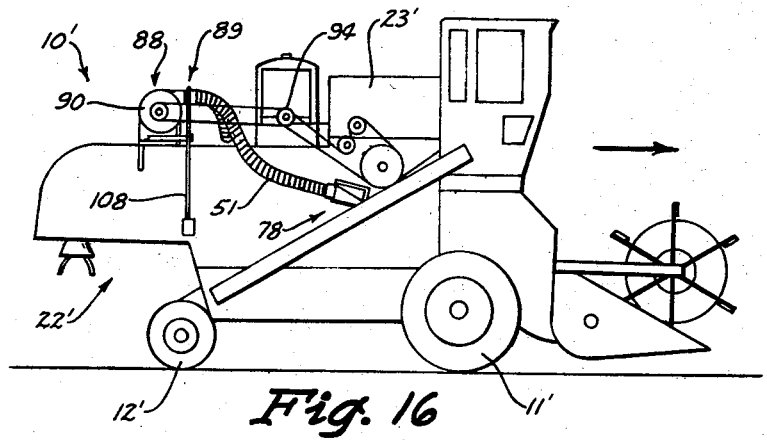
FIG. 16 is a view similar to FIG. 1 of a second modified arrangement for the separator unit.
Figure 17:
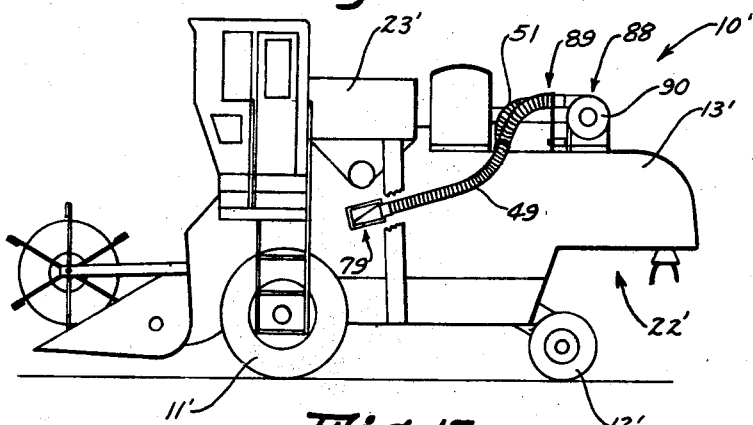
FIG. 17 is a view of the other side of the harvester of FIG. 16.

The first embodiment of this invention as illustrated in FIGS. 1–13 inclusive comprises generally an air blower unit 28 (FIG. 3), an air conduit unit 29, a manifold unit 31, and an air valve control unit 32.

The air blower unit 28 comprises the blower fan 18 which has a predetermined static air pressure rating, and which is operated by a belt 34 (FIG. 3) and pulley 36 operated off one of the combine pulleys 37.

Air under static pressure is discharged from the blower fan 18 through an elongated, rectangular and diverging-type housing 38 for transmitting the air from the fan outlet 39 (FIG. 5) to the inlet side 41 of the housing 13 at the cleaning mechanism innermost end. A pair of hand operated valves 42 and 43 are inserted in the housing 38, the first valve 42 for controlling the amount of air passing through the housing 38, with the second valve 43 functioning as a deflector plate for controlling the longitudinal placement of the air beneath the riddle unit 16. Referring to FIG. 10, fluting 44 at the rearmost end of the housing 38 is illustrated, which fluting aids in controlling the direction of the air being transmitted from the blower fan 18 into the interior of the cleaning mechanism.

By this arrangement, a predetermined volume of air under a constant static pressure is provided for the cleaning area, enabling also a smaller intake for the blower fan 18 which obviates the pulling into the fan of trash and dirty air. To further obviate this, one end of the fan 18 is closed off, with the other end fluidly communicated to the lower end 46 (FIG. 1) of an upright casing 47 attached to one side of the machine housing 13. The upper, protected open end 48 of the casing 47 thereby provides a clean air intake for the blower fan 18 and thus for the cleaning area.

The air conduit unit, indicated generally at 29 in FIG. 4, comprises a pair of flexible conduits 49 and 51 attached at their one ends, respectively, to a pair of outlet pipes 52 and 53 which are part of the valve control unit 32, and with the conduits 49 and 51 attached at their other ends to a pair of manifold housings 54 and 55, the latter being part of the manifold unit 31. It will be noted from FIG. 4 that the conduits 49 and 51 actually cross over and under each other for a purpose described hereinafter.

In addition to the manifold housings 54 and 56, the manifold unit 31 includes a flat plate 57 (FIGS. 4 and 5) which is secured to the housing 13 immediately above the innermost end 58 (FIG. 5) of the riddle 16. The provision of the plate 57 enables grain coming off the raddle unit 14 to have a smoother longitudinal flow toward the rear opening 24 of the housing 13, and provides a smooth surface for enabling better deflection of the grain by operation of the manifolds 54 and 56, thereby obviating a build-up of grain on either side of the plate 57 and thus the riddle 16.

As each manifold housing 54 and 56 is identical, only one will be described with like parts indicated by like reference numerals. The manifolds 54 and 56 are of a mirror-type, such that they are adapted for right and left mounting in facing directions on opposite sides of the riddle 16.

The manifold housing 54 (FIG. 3) comprises an air tight housing 59 of a substantially rectangualr form as best seen in FIG. 6, and which is secured as by brackets 62 (only one showing in FIG. 10) to an upright sidewall 61 (FIG. 6), the latter being an integral part of the reciprocating riddle 16. The rear end 63 of the housing 54 (FIG. 5) is secured to one end of the conduit 51 for receiving air under pressure through the valve control unit 32. An elongated, straight slot 64 is formed in the housing 56 along the bottom surface thereof so as to be parallel to and spaced slightly above the upper surface of the riddle 16 (FIG. 5). It will also be seen that the upper smooth surface of the plate 57 extends parallel to and but slightly below the slot 64 at one end thereof.

By this arrangement, upon air being received in the manifold housing 54, it is transmitted and discharged through the slot 64 in the form of a blanket of air under pressure force laterally of the riddle 16 toward the other manifold housing 56. This action ensures, particularly when the combine 10 is traveling over level terrain, a continual cleaning and aerating of the chaff and granular material being passed from the separator unit 14 to the riddle 16. Furthermore, it has been found that due to the action of the cleaning fan 18, an area of the riddle 16 at the innermost end 58 thereof receives such blast of air that a bald spot occurs at times, there being therefore an area where it is difficult to clean and separate the grain from the chaff. By means of the air being forced laterally thereover from the manifolds 54 and 56, the air in that area from the cleaning fan 18 is subdued such that normal separating action of the riddle 16 is retained.

The provision of the plate 57 is also seen at this point in that it enables the material initially being discharged onto the riddle 16 to have a smooth surface over which to flow, enhancing the chance of the blankets of air forced laterally thereagainst to effectuate their purpose in preventing the collection of grain on one side of the riddle or the other during inclination of the machine 10.

The valve control unit 32 comprises an auxiliary tube 66 (FIG. 4) attached to and in communication with the housing 38 for receiving air under static pressure from the blower fan 18. The tube 66 is connected to the center of a support plate 67, the latter having an opening therein of the same size as the diameter of the tube 66, and which plate 67 by the means of a plurality of lugs 68 supports an elongated, reciprocally movable valve plate 69 (FIG. 7).

The valve plate 69 has the two outlet pipes 52 and 53 secured thereto in spaced relation, with the sizes of the pipes 52 and 53 being substantially identical to that of the auxiliary tube 66. One end of the valve plate 69 has limit lugs 71 affixed thereto for limting movement of the valve plate 69 in one direction relative to the stationary plate 67 (FIG. 8). The opposite end of the valve plate 69 is connected by an adjustable link 72 to a pivotal connection at a pendulum 73, the upper end of which is pivotally connected to the machine housing 13 by a bracket 74. It thus may be seen that any inclination of the machine 10 to one side or the other affects the position of the valve plate 69 relative to the stationary plate 67 by means of the swinging movement of the pendulum 73, the latter adapted to swing laterally relative to the stationary plate 67 and to the flow of granular material longitudinally of the machine 10.

The spacing between the pipes 52 and 53 (FIG. 7) is such that when the machine 10 is on a perfectly level terrain, with the pendulum 73 suspended in a perfectly vertical position, wherein the valve plate 69 is in a neutral position relative to the stationary plate 67, adjacent portions 76 and 77, respectively, of the pipes 52 and 53 are open to the auxiliary tube 66. Thus, air being discharged from the blower fan 18 through the rectangular housing 38 is also transmitted through the tube 66 in even amounts to both conduits 49 and 51 for discharge through the respective slots 64 (FIG. 10) of the manifold housings 54 and 56. By this arrangement, then, when the machine 10 is on perfectly level terrain, equal amounts of air under static pressure are discharged in blankets of air as described hereinbefore toward each other across the innermost end 58 of the riddle 16 for maintaining the grain and other material passing thereacross in a level condition. This flow of air from the respective manifold housings 54 and 56 in even amounts is best illustrated in schematic form in FIG. 12.

Referring to FIG. 11, the condition of the machine 10 is shown tilted to the left such as to effect an outward movement of the pendulum 73 away from the stationary valve plate 67 and tube 66. In this condition of the machine 10, it is desirable to effect a full flow of air from the "down" manifold housing 56 upwardly over the inclined riddle 16, while shutting off the flow of air from the manifold housing 54. Thus, referring to FIG. 8, it is seen that the valve plate 69 is moved to its outermost position with the opening of pipe 52 aligned with the auxiliary tube 66, and where the pipe 53 is completely closed off from the tube 66. Air from the blower fan 18 is thus transmitted through the pipe 52 and the conduit 49 to the manifold housing 56. The purpose of crossing over the conduits 49 and 51 is thus seen at this time. By this arrangement, then, all of the air taken by the auxiliary tube 66 from the housing 38 is transmitted through the particular slot 64 of the manifold housing 56 (FIG. 10) and forced in a blanket over the innermost end 58 of the riddle 16 to thus prevent a build-up of grain and other material on that side of the riddle 16.

The schematic illustration of FIG. 13 shows the opposite of the FIG. 11 position, wherein the pendulum 73 is now swung inwardly toward the auxiliary tube 66 and its plate 67 such that the opening for the pipe 53 would be in alignment with the tube 66 opening whereby air would be transmitted through the pipe 53 and its flexible conduit 51 to the manifold housing 54 shown to be on the "down" side of the combine 10 in FIG. 13. Thus again, in the FIG. 13 condition of the combine 10, a blanket of air would be forced upwardly over the riddle 16 to prevent grain and other material from building up on the "down" side of the riddle 16, tending thereby to prevent a concentration of trash and grain on the riddle 16 which would be detrimental to cleaning and separation of the grain.

Figure 24:
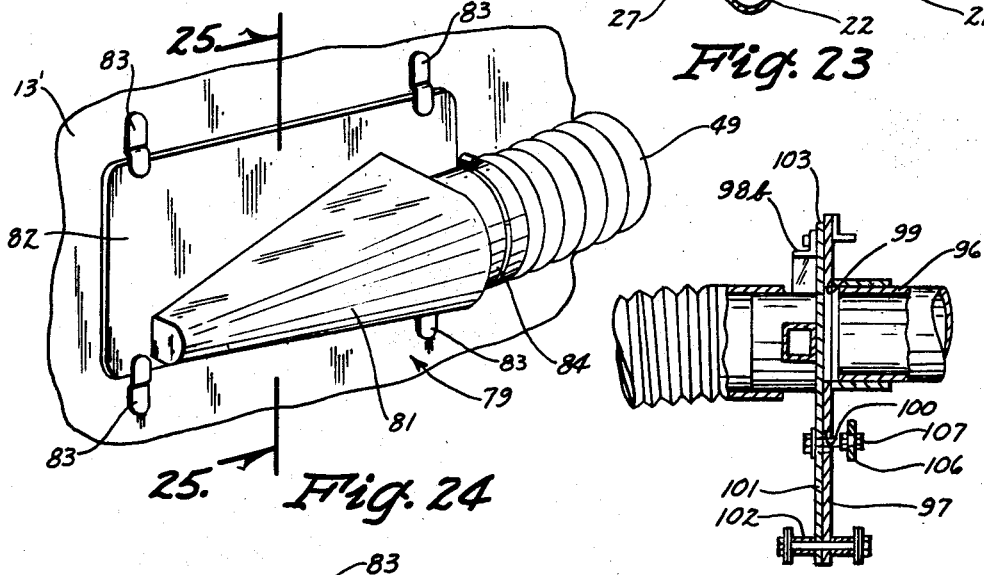
FIG. 24 is an enlarged perspective, exterior view of a manifold of the FIG. 16 embodiment.
Figure 25:
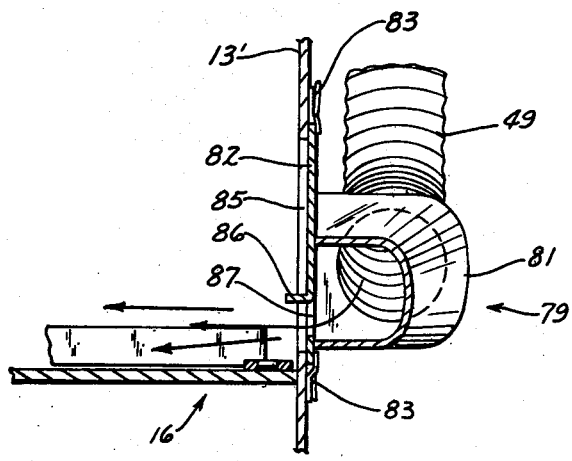
FIG. 25 is a sectional view taken along the line 25—25 in FIG. 24.

Referring now to FIGS. 14 and 15, in addition to FIGS. 24 and 25, a second embodiment of the invention is disclosed. Rather than utilizing air from the manifolds 54 and 56 directed across the innermost end 58 of the riddle 16, new manifolds 78 and 79 (FIG. 15) are secured to the outer free ends of the conduits 51 and 49, respectively, such that air from the auxiliary tube 66 is transmitted in opposed blankets over the upper surface of the raddle unit 14 as best illustrated in FIG. 14.

To accomplish this, large rectangular cutouts 85 are formed in the outer wall of the combine housing 13 (FIG. 29). Each cutout 85 is filled with a manifold, and as both manifold housings 78 and 79 are identical, only one will be described. Again, these housings 78 and 79 are of a mirror-type so as to be mounted in left and right facing positions The manifold housing 79, for example, comprises an air-tight housing 81 (FIG. 24) integral with a flat panel 82 adapted to be secured over the cutout 85 by means of clips 83 secured to the housing 13'. An elongated slot 87, similar to the slot 64 in the manifold housings of FIG. 10, is formed in the panel 82 below a lip 86; and wherein when the panel 82 is secured to the wall 13', the straight slot 87 extends parallel to and slightly above the upper surface of the raddle unit 14 (see FIG. 14). One end of the housing 81 is attached by means of a fitting 84 to the outer end of the conduit 49, whereby upon receiving air through the conduit 49, the air is transmitted again in the form of a blanket of air under pressure through the slot 87 (see FIG. 25) and across and parallel to the upper surface of the raddle unit 14.

As the air blower unit 28, the air conduit unit 29, and the valve control unit 32 of the first embodiment remain the same, air as directed through the manifold housings 78 and 79 of the second embodiment is controlled in the same manner as shown in schematic form by FIGS. 11–13 for the machine 10.

The basic difference, then, between this embodiment and the first embodiment of FIGS. 1–13 is that the air under static pressure for aiding the cleaning and aerating of the material being passed through the combine is transmitted laterally in opposed directions, or in one direction only, across the raddle unit 14 instead of the riddle unit 16.

A second modification of this invention is shown in FIGS. 16 through 23 inclusive, with the structure of FIGS. 24 and 25 also applicable to this particular modification. The basic change here is that rather than deriving air from the lower blower unit 28, an upper blower unit 88 (FIG. 16) is provided, and with a new valve control unit 89 also being provided. In all other respects, as the machine is substantially identical to the machine 10 of the prior figures, like parts are indicated by like reference numerals with the addition of a prime thereto.

The upper blower unit 88 comprises a blower fan 90 having a predetermined static air pressure rating and which is mounted on the machine 10 by a bracket 91. A drive pulley 92 of the fan 90 drives power by means of a belt 93 from a pulley 94 of the machine. The blower fan 90 has a tubular outlet 96 (FIG. 18) to which a generally triangular vertical plate 97 is secured.

The plate 97 has a trio of bars 98a, 98b, and 98c (FIG. 19) secured to the top edge thereof for providing a guide slot therein. Furthermore, the plate 97 has an opening 99 centrally thereof in alignment with the outlet 96, and is also provided with an arcuate slot 100 (see FIG. 21).

Pivotally connected to the plate 97 on the side thereof opposite the blower fan 90 side is a triangular shaped valve plate 101, the pivot 102 being at the base of both plates 97 and 101. The valve plate 101 has a curved top edge 103 for insertion in the slot formed by the bars 98 such that the valve plate 101 is pivotally movable laterally of the stationary plate 97 as best shown by the positions of the valve plate 101 in FIGS. 19 and 21.

A pair of laterally spaced outlet pipes 104 and 105 are secured to the valve plate 101, the diameter of each outlet pipe being substantially identical to the diameter of the opening 99 in the stationary plate. Each outlet pipe 104 and 105 is also alignable with the opening 99 for the transmission therethrough of air under pressure from the blower fan 90. The valve plate 101 is moved by an adjusting arm 106 secured by means of a pivot 107 (FIG. 19) through the arcuate slot 100 to the center of the valve plate 101. The outer end of the arm 106 is pivotally connected to the upper end of a pendulum 108 (FIG. 18).

It will be noted that the pendulum 108 is connected intermediate its ends thereof to the outer end of a stationary bar 109 secured to the mounting bracket 91. By this means, upon a tilting or inclination of the machine 10′ in either direction, the valve plate 101 will be moved in an opposite direction to the inclination of the machine 10′. The outlet pipes 104 and 105 are connected in turn to the flexible conduits 49 and 51 to a pair of manifold housings 78 and 79, respectively, identical to the manifold housings 78 and 79 of FIG. 15, and which housings are also adapted to direct a flow of air under pressure laterally across the raddle unit 14 as described hereinbefore.

Figure 20:
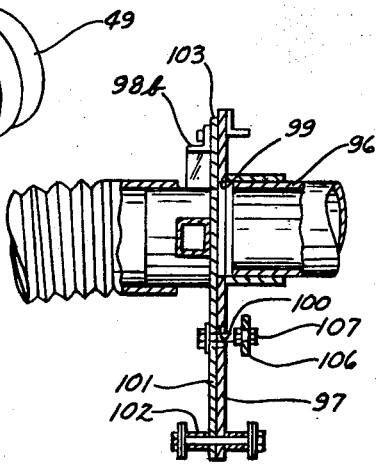
FIG. 20 is a sectional view taken along the line 20—20 in FIG. 19.

Importantly, the outlet pipes 104 and 105 are interconnected for the transmission of fluid such as air therebetween by means of a passage 111 (FIG. 20). By this arrangement, when the valve plate 101 is in its neutral position as shown in FIG. 19, the spacing of the outlet pipes 104 and 105 is such that portions 112 and 113 of the pipes 104 and 105, respectively (FIG. 19) are both open to the outlet 96 such that air under pressure is directed through both conduits 49 and 51 to both manifold housings 78 and 79. In looking from the rear of the upper blower unit 88 and the machine 10′, wherein the pendulum 108 extends to the right as one views FIG. 18, should the machine 10′ be inclined to the left, this would cause movement of the valve plate 101 to the right as viewed in FIG. 18, wherein outlet pipe 104 would be aligned with the outlet 96. Fluid would thus be transmitted through outlet pipe 104 and line 49 to the left side of the machine 10′, as viewed from the rear, and to the manifold housing unit 79 for forcing air upwardly over the raddle unit 14, inclined due to the inclination of the machine 10′.

Figures 18, 19:
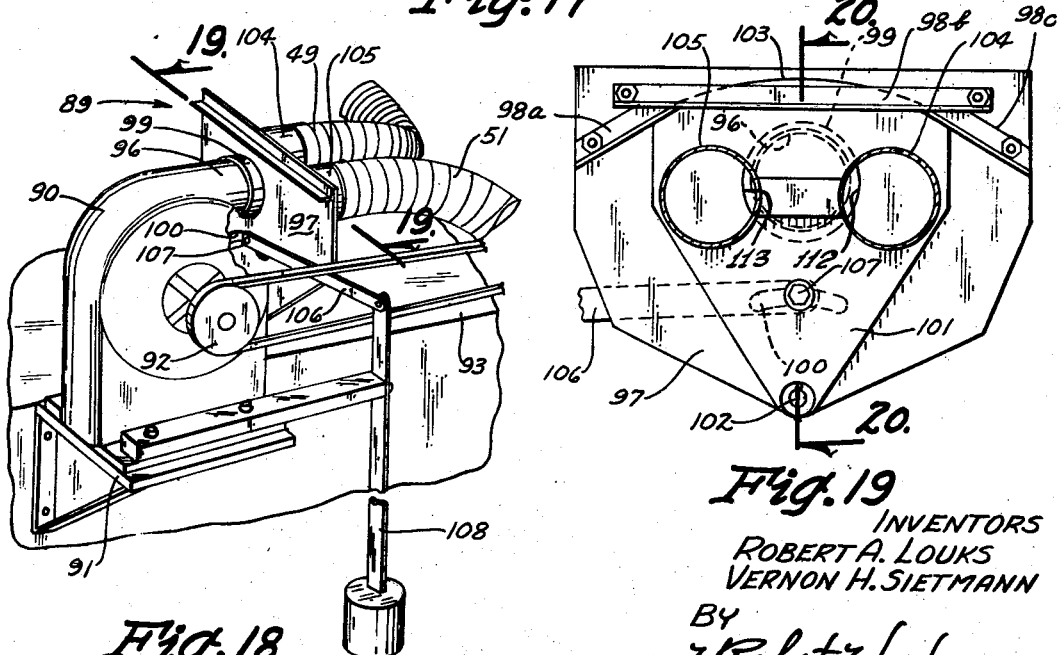
FIG. 18 is a perspective view of the blower and valve arrangement for the FIG. 16 embodiment.
FIG. 19 is an enlarged sectional view taken along the line 19—19 in FIG. 18.

Conversely, should the machine 10′ be tilted to the right, retention of the pendulum 108 in its vertical condition would cause the valve plate 101 to be pivoted to the left as viewed in FIG. 18 whereby outlet pipe 105 would be aligned with outlet 96 and opening 99 as shown in FIG. 21. Air would then be discharged from the blower fan 90 through the conduit 51 to the right manifold 78 (FIG. 16) as viewed from the rear of the machine 10′, and air would thus be blown across the raddle unit 14 from the manifold 78 as also illustrated in FIG. 23. Due, furthermore, to the provision of the bypass passage 111 (FIG. 20) between the two outlet pipes 104 and 105, irrespective of the inclination of the machine 10′, there will always be a small amount of air under pressure coming out of the slot 87 in the manifold housing on the high side. The purpose of this is to prevent foreign material of any kind from being blown into the manifold on the high side due to the air pressure coming out of the manifold housing on the low side. Thus, a positive pressure of air is always emanating from either manifold housing 78 and 79 of the FIG. 16 embodiment.

In FIGS. 26–28 inclusive, another modification of the invention is illustrated. Still using the blower fan 90 of FIG. 26, the pendulum-type control valve 89 is removed and substituted is a simple Y-type housing 112 secured to the outlet 96 of the fan 90. The housing 112 nearly equally divides the air from the fan 90 for transmission equally through the two conduits 49 and 51 to their respective manifold housings 113 and 114. Housings 113 and 114 are identical to the manifold housings 54 and 56 of FIG. 4. Secured to and extended between the manifold housings 113 and 114, and replacing the smooth plate 57 of FIG. 4 is a rectangular enclosure 116 spaced barely above the upper surface of the riddle 16 and encompassing at both ends the respective slots 64 in the manifold housings 113 and 114. The enclosure 116 thus reciprocates with the housings 113 and 114 and receives all of the air directed outwardly therefrom.

Formed along the trailing upper edge of the enclosure 116 is an elongated, straight slot 117. Thus upon air being forced outwardly of the slots in the manifold housings 113 and 114, coming into the enclosure 116, that air is forced upwardly and outwardly of the enclosure slot 117 in a direction angularly related and axially of movement of the material coming over the riddle 16 from the separator unit 14. The provision of this upward and rearwardly directed stream of air under pressure provides a suspension of dirt and other foreign material from the heavier grain, thereby enabling a more efficient cleaning of the grain at this point in the cleaning process, and providing increased capacity of cleaner grain in the tank. This arrangement is more preferably used on level terrain, and not where the terrain is sufficiently hilly to warrant the use of the valve control arrangements described hereinbefore. It is contemplated that the enclosure 116 could be removable from the manifold housings 113 and 114; with a replacement of the valve control unit 89 for the Y-type housing 112, whereby the arrangement of FIG. 16 would again be obtained.

Although several embodiments of the invention have been described and defined hereinbefore, it is not to be so limited as other modifications and alterations can be made thereto without departing from the intended scope and spirit of the invention as defined in the appended claims.

We claim:

1. In a threshing machine mounted on a wheeled frame having a rotatable element, and having a housing within which a raddle unit and a riddle unit are conventionally mounted, apparatus for aiding the separation of grain from the material passing longitudinally over the units comprising:

blower means mounted on the machine and operable to pull in air from the atmosphere;

conduit means including a pair of conduits having opposite open ends;

valve means interconnected between said blower means and common ends of said conduits for controlling the flow of air from said blower means to said conduit means in response to lateral inclination of the machine; and manifold means mounted on said housing on opposite sides of a unit and connected to the other end of said conduit means, said manifold means capable of directing air across the suface of a unit angularly to the flow of the material over the unit;

said valve means operable in one position when said machine is on level terrain to transfer a reduced amount of the air to both said conduits, and said valve means operable in another position when the machine is on uneven terrain to transfer a majority of the air to the conduit leading to said manifold means on the downhill side of the machine, and to simultaneously transfer the remainder of the air to the conduit leading to said manifold means on the uphill side of the machine.

2. In a threshing machine, apparatus as defined in claim 1, wherein the blower means includes a blower fan mounted on said housing below said units, and air intake means mounted on said housing with a discharge end connected to said blower fan and an intake end disposed at the top of the housing;

wherein said blower fan is of the centrifugal type with one end thereof closed to the atmosphere, and the other end fluidly connected to said air intake means discharge end;

wherein an air passage duct is connected at one end to the discharge end of said blower fan and at the other end to the housing interior below the riddle unit whereby air discharged through said duct is forced upwardly toward and through said riddle unit, and further wherein said conduit means comprises a fluid supply member interposed between and fluidly communicating said valve means and said duct for receiving part of the air discharged from said blower fan, and at least a pair of fluidly discharged members interposed between and fluidly communicating said manifold means with said valve means; and further wherein said manifold means comprises a pair of identical, mirror-type manifold housings mounted directly opposite each other, and each of which is fluidly connected to a discharge member, each manifold housing having an elongated slot formed therein extended substantially level and parallel with the upper surface of the said unit.

3. In a threshing machine, apparatus as defined in claim 2, and further wherein said manifold housings are mounted on opposite sides of the riddle unit and are stationary during operation of the machine.

4. In a threshing machine, apparatus as defined in claim 3, and further wherein said valve means is operable to direct air to both manifold housings irrespective of the the inclination of the machine.

5. In a threshing machine, apparatus as defined in claim 2, and further wherein said manifold housings are mounted on opposite sides of the raddle unit and are stationary during operation of the machine.

6. In a threshing machine, apparatus as defined in claim 5, and further wherein said valve means is operable to direct air to both manifold housings irrespective of the inclination of the machine.

7. In a threshing machine, apparatus as defined in claim 1, and further wherein air chamber means is secured between said manifold means over the surface of a unit, said air chamber means fluidly receiving said blanket of air for changing the direction of said blanket of air to axially and upwardly of the material longitudinally of the unit.

8. In a threshing machine, apparatus as defined in claim 7, and further wherein said air chamber means comprises a container secured to and extended between said manifold housings for enclosing said blanket of air, said housing having an elongated slot formed therein on its downstream end angularly to the flow of the material over the unit.

References Cited

UNITED STATES PATENTS

| | | | |
|---|---|---|---|
| 2,611,487 | 9/1952 | Stevenson | 130—27.18 |
| 2,692,679 | 10/1954 | Lindberg et al. | 130—24 |
| 2,694,493 | 11/1954 | Odegarden | 209—261 |
| 2,750,037 | 6/1956 | Taylor | 209—261 |
| 2,849,118 | 8/1958 | Ashton | 130—24 |

ANTONIO F. GUIDA, Primary Examiner

U.S. Cl. X.R.

209—24, 312, 416